United States Patent [19]
Corwin, III et al.

[11] Patent Number: 5,896,296
[45] Date of Patent: Apr. 20, 1999

[54] "SHORT PART" DETECTOR FOR AUTOMATIC SCREW MACHINE

[75] Inventors: Donald B. Corwin, III; Gary L. Nettleton, both of Rochester, N.Y.

[73] Assignee: Buell Automatics, Inc., Rochester, N.Y.

[21] Appl. No.: 08/937,205

[22] Filed: Sep. 17, 1997

[51] Int. Cl.⁶ .................. G06F 19/00; B23B 13/00; B23B 5/22
[52] U.S. Cl. .................. 364/474.37; 364/468.17; 364/474.02; 364/474.09; 364/474.17; 414/17; 414/18; 82/126; 82/127; 82/124
[58] Field of Search .................. 364/468.17, 474.02, 364/474.09, 474.17, 474.37; 414/17, 18; 82/126, 127, 124

[56] References Cited

U.S. PATENT DOCUMENTS

| | | |
|---|---|---|
| 417,538 | 12/1889 | Burdsall, Jr. |
| 1,921,345 | 8/1933 | Clouse .................. 10/11 |
| 1,942,069 | 1/1934 | Setoguchi et al. .................. 140/145 |
| 2,247,766 | 7/1941 | Boerger .................. 164/49 |
| 2,913,829 | 11/1959 | Arlin .................. 33/147 |
| 3,680,414 | 8/1972 | Ryswick .................. 82/2.7 |
| 3,854,356 | 12/1974 | Okreglak .................. 83/66 |
| 4,071,918 | 2/1978 | Baer .................. 10/10 |
| 4,281,385 | 7/1981 | Nakaso et al. .................. 364/474 |
| 4,302,996 | 12/1981 | Wilhelm .................. 83/212 |
| 4,428,055 | 1/1984 | Kelley et al. .................. 364/474 |
| 4,554,495 | 11/1985 | Davis .................. 318/572 |
| 4,562,392 | 12/1985 | Davis et al. .................. 318/572 |
| 5,001,464 | 3/1991 | Tanaka .................. 340/680 |
| 5,310,064 | 5/1994 | Neff et al. .................. 209/604 |
| 5,326,210 | 7/1994 | Savage .................. 414/17 |

*Primary Examiner*—Reba I. Elmore
*Assistant Examiner*—Navin Natnithithadha
*Attorney, Agent, or Firm*—Eugene Stephens & Associates

[57] ABSTRACT

A simple wire probe is positioned between work stations of a multi-spindle automatic screw machine so that, when the spindles of the machine are indexed, the probe is contacted by the distal end of a properly-sized workpiece and a signal is sent to a conventional programmable logic controller ("PLC"). At the initiation of each cyclical indexing of the machine's spindles, an electronic timing "window" is opened in the PLC and, so long as the signal is received from the probe while the timing window is open, the PLC permits the machine's cyclical operations to continue. If, however, no signal is received during the preset time interval, indicating a "short part", the PLC is programmed to stop the machine drive and to provide a sensible indication (e.g., a flashing light) to call to the attention of the machine operator. The location of the probe does not limit the normal use or operation of any tool at any work station of the machine.

9 Claims, 3 Drawing Sheets

"SHORT PART" DETECTOR FOR AUTOMATIC SCREW MACHINE

TECHNICAL FIELD

This invention relates to the manufacture of products on automatic screw machines and, more particularly, to apparatus for detecting the manufacture of improperly-sized products.

BACKGROUND

Multiple-spindle automatic screw machines (e.g., Davenports, Acme, etc.) have long been the world's primary means for forming and cutting off small parts (e.g., screws, bolts, pins, etc.) from the ends of workpieces of long bar stock (cylindrical metal bars). Such automatic screw machines have multiple spindles (which each receive and hold a respective bar stock workpiece), and they have automatic cyclical drives that serially feed and position the distal end of each workpiece bar in a respective one of the work-holding spindles.

The screw machine's automatic operations also serially index the spindles relative to a plurality of sequential tool-holding work stations. At the first work station, the distal end of each workpiece bar is serially fed to a pre-shaping location within its respective work-holding spindle so that a distal end portion of the bar projects beyond the face of the spindle a predetermined distance. Thereafter, at each successive work station, each spindle holds and/or rotates its respective workpiece while a respective tool, which is adjustably mounted at each work station, shapes a portion of the rotating workpiece. As the spindles index through each successive work station, the distal end portion of each bar workpiece is formed into a desired product having specified dimensions. At a final work station, the product is separated from the workpiece bar; and as the machine is indexed once more, a new length of workpiece is fed into the spindle which is then returned to the first work station to begin the formation of another part.

The inadvertent manufacture of "short parts" (improper length) has been a chronic problem for the operators of such machines since their inception nearly a hundred years ago. That is, parts having a length that is less than a predetermined minimum requirement may be turned out by the hundreds before the operator notes that the machine is producing such an unacceptable product. However, with recent "zero defect" quality control requirements for parts suppliers, the production of even a single short part can expose the part manufacturer to returns and complaints and, more importantly, can affect consumer safety in many applications.

Very sophisticated and accurate part cutting machinery is well known, and all include very complex measuring apparatus for determining part accuracy. For example, such complex measuring apparatus often comprise specially constructed position probes (e.g., see U.S. Pat. No. 5,001,464 to Tanaka), optical encoders (e.g., see U.S. Pat. No. 5,310,064 to Neff et al.), sophisticated electronic circuitry, etc. These known prior art part measuring systems are all relatively expensive to install; difficult to set up; and, for generally unattended automatic screw machines, impractical to use.

The invention disclosed herein is a simple and relatively inexpensive accessory which can be readily affixed to existing standard (unsophisticated) screw machines for overcoming the chronic and expensive "short part" problem.

SUMMARY OF THE INVENTION

Preferably, the "short part" detector of the invention comprises a simple, wire-like probe that is suspended cantilever fashion at a location intermediate two successive work stations on the tool-holding portion of a multiple-spindle automatic screw machine. The probe is positioned so that it does not interfere in any way with the operation of tools located at either of the two successive work stations during the cyclical and serial operations of the machine. The probe is adjusted to make contact with the distal end of each bar workpiece that is of the correct length as the workpiece is indexed between the stations. If no contact is made between the workpiece and the probe, the screw machine is automatically shut down and a warning signal is initiated to call to the attention of the machine operator that a short part has been detected.

The apparatus associated with the probe is also remarkably simple: In addition to the probe itself, the only other elements are a proximity switch, a basic transistor switch circuit (e.g., using standard NPN input), and a conventional programmable logic controller ("PLC"). All of these further elements are relatively inexpensive and well known to persons skilled in the art, and no claim is made to any of these devices other than in the particular combination shown.

Operation of our detection system is specially coordinated with the repeating cycles of the screw machine's operation. In the preferred design, the proximity switch is positioned relative to a feed throw arm (or some other appropriate portion of the machine drive) that is activated at the initiation of each screw machine cycle. The sole purpose of this proximity switch is to provide an indication of the machine's on-coming spindle indexing cycle. The initiation of the machine cycle is sensed by the proximity switch, and a signal is sent to the PLC for starting a timing circuit that creates a "window" of time approximately equivalent to the time it takes a workpiece to index past the probe to the next machining position (e.g., 0.3 seconds).

As the distal end of each successive workpiece makes contact with the probe, the input of the NPN transistor circuit is momentarily connected to the grounded machine, sending a signal to the PLC. If this signal is received during the time window just referred to above, the PLC energizes appropriate circuitry to allow the machine drive to continue operation and to direct the finished part to the "good part" bin. (NOTE: The PLC can use this same signal to generate further related data, e.g., a running part count, warnings for need of predictive or preventative maintenance, up-time, down-time, end of workpiece stock, etc.)

However, if the probe does not contact a workpiece during the preselected time window, the PLC receives no signal and is programmed to shut down the machine (to avoid production of more unacceptable "short parts") and also to activate a warning light or other sensible signal to call the operator's attention to this problem machine. Surprisingly, this simple detection assembly can detect "short parts" within 0.004" (0.1 mm).

Again, the specific known electronics relating to the transistor switch circuit and the off-the-shelf PLC module are not considered pertinent except insofar as applied to the particular "short part" assembly just described above.

DRAWINGS

DETAILED DESCRIPTION

Figure 1:
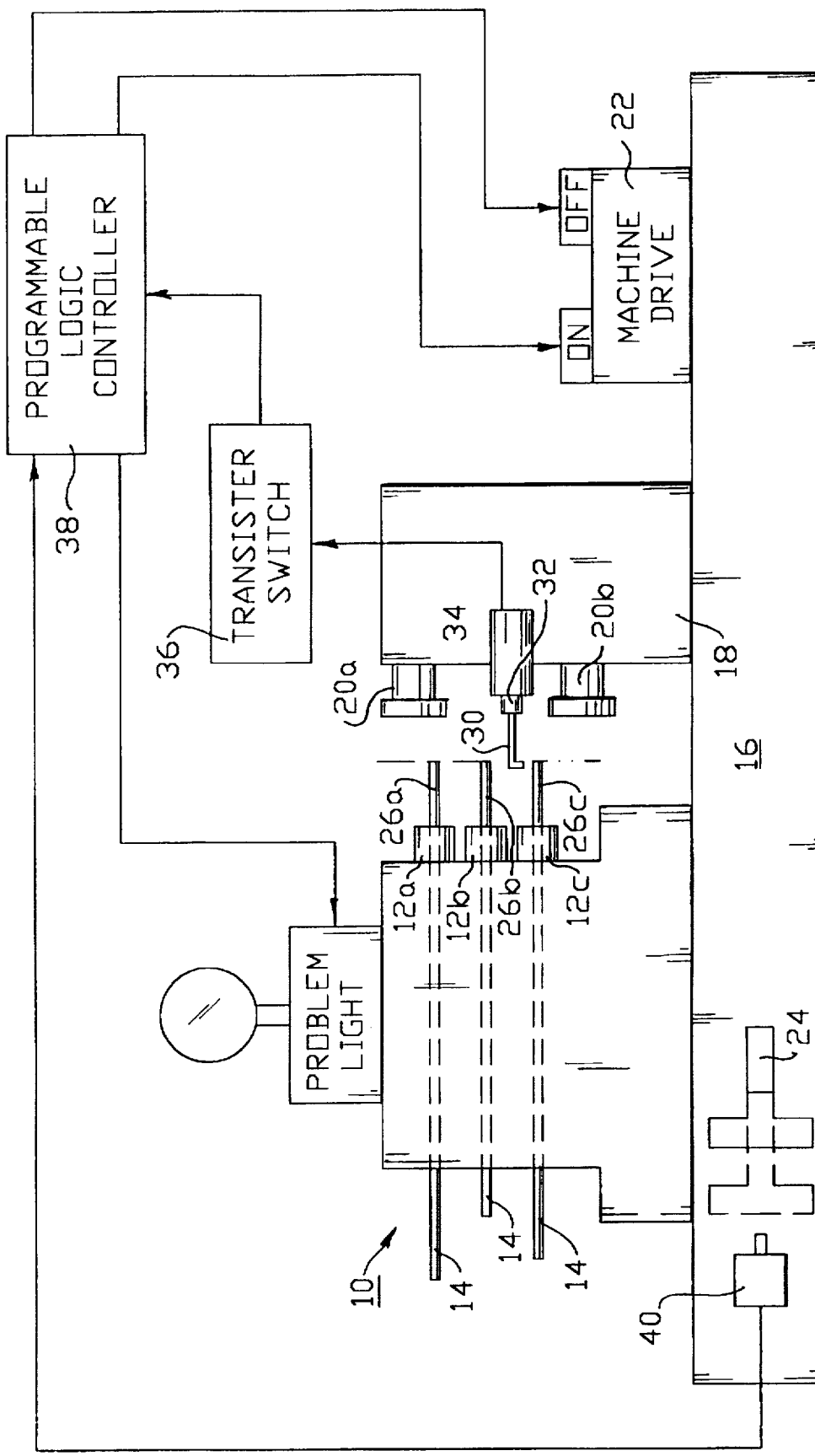
FIG. 1 is a combined schematic and block diagram showing the invention attached to a standard multiple-spindle automatic screw machine.

A multiple-spindle automatic screw machine 10 is shown schematically in FIG. 1. Machine 10 includes a plurality of workholding spindles 12a, 12b, and 12c, each spindle receiving and holding a respective workpiece bar 14. Spindles 12a, 12b, and 12c are mounted on a machine base 16 which also carries a tool-holding portion 18 in which a plurality of tools are mounted for cutting respective portions of workpiece bars 14 to form the desired part being produced. The respective tools (not shown) are each mounted in respective tool-holding work stations 20a, 20b.

A machine drive 22 includes a feed throw arm 24 which, at the initiation of each machine cycle, moves to the position shown in dotted lines and back for serially feeding each workpiece bar 14 through its respective spindle when that spindle is moved to the first work station as indicated by spindle 12a. Each bar 14 is fed to a pre-shaping location so that a distal end portion 26a, 26b, 26c projects beyond the face of its respective spindle a distance equal to or greater than the desired length of the part being manufactured.

Machine drive 22 serially indexes spindles 12a, 12b, 12c past each of the several work stations 20 (only two shown); and, at the final work station 20b, the part that has been formed in the distal portion 26c is separated from its workpiece bar 14 and delivered to a "good part" bin (not shown in FIG. 1).

As indicated above, the parts usually manufactured on such screw machines are relatively small, they are manufactured relatively fast, and the machines run automatically. Therefore, if for any reason the parts being manufactured are improperly sized, many hundreds can be produced by this automatic operation before the error is noted. Further, as indicated above, even a single inaccurate part can create safety or financial problems for the part manufacturer. Perhaps the most common accuracy problem relates to the manufacture of parts with inadequate length, and the invention overcomes this problem by using the simple apparatus that will now be described in detail.

An electrically conductive probe 30 is fixed within an insulating sleeve 32 fitted within an elongated body 34 that is appropriately mounted to the frame of the screw machine's tool-holding portion 18. The end of probe 30 is positioned so that it will make contact with the distal end 26b of the workpiece as it is being indexed between work stations 20. Electrically, screw machine 10 is grounded as are spindles 12 and workpiece bars 14. Therefore, when probe 30 contacts the distal end of a workpiece as it is being indexed, probe 30 also becomes electrically grounded momentarily, causing a transistor switch 36 to deliver a signal to a programmable logic controller ("PLC") 38, thereby providing essential information the invention's detection system, the operation of which will be described next.

Figure 2:
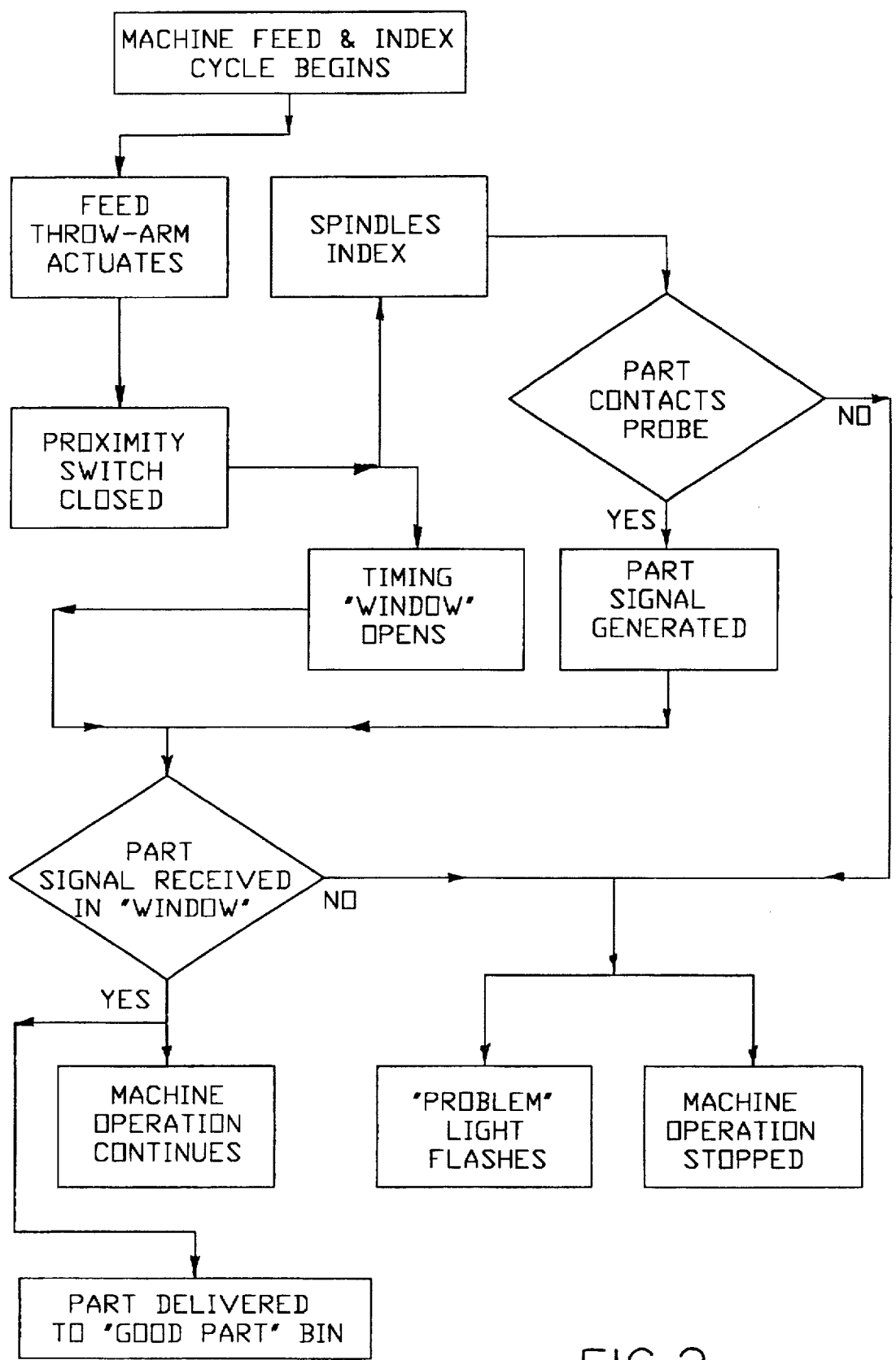
FIG. 2 is a flow chart illustrating the sequential operation of the invention's "short part" detection apparatus.

Reference is now also made to the flow chart of FIG. 2 which illustrates the sequential operation of the detection apparatus. As indicated earlier, feed throw arm 24 operates at the initiation of each serial machine cycle; and when this occurs, a proximity switch 40 sends a signal to PLC 38, starting a timing circuit which is long enough to encompass the time it takes the end of a distal end portion 26 to be indexed past probe 30. If, as indicated above, the tip of a part formed on the distal end portion 26b contacts probe 30, a signal is sent to PLC 38. If that signal is received during the window of time created by the timing circuit, PLC 38 is programmed (i) to permit machine drive 22 to continue its cyclical operations and (ii) to direct the machine to deliver the product to the "good part" bin when it is separated from the workpiece at final work station 20b.

However, if the tip of distal end portion 26b does not make contact with probe 30, no signal will be received in the timing window of PLC 38; and in that event, the latter is programmed (i) to stop machine drive 22 so that no further short parts will be manufactured, and (ii) to initiate a signal, e.g., flashing light 42, to call the attention of the machine operator.

Figure 3:
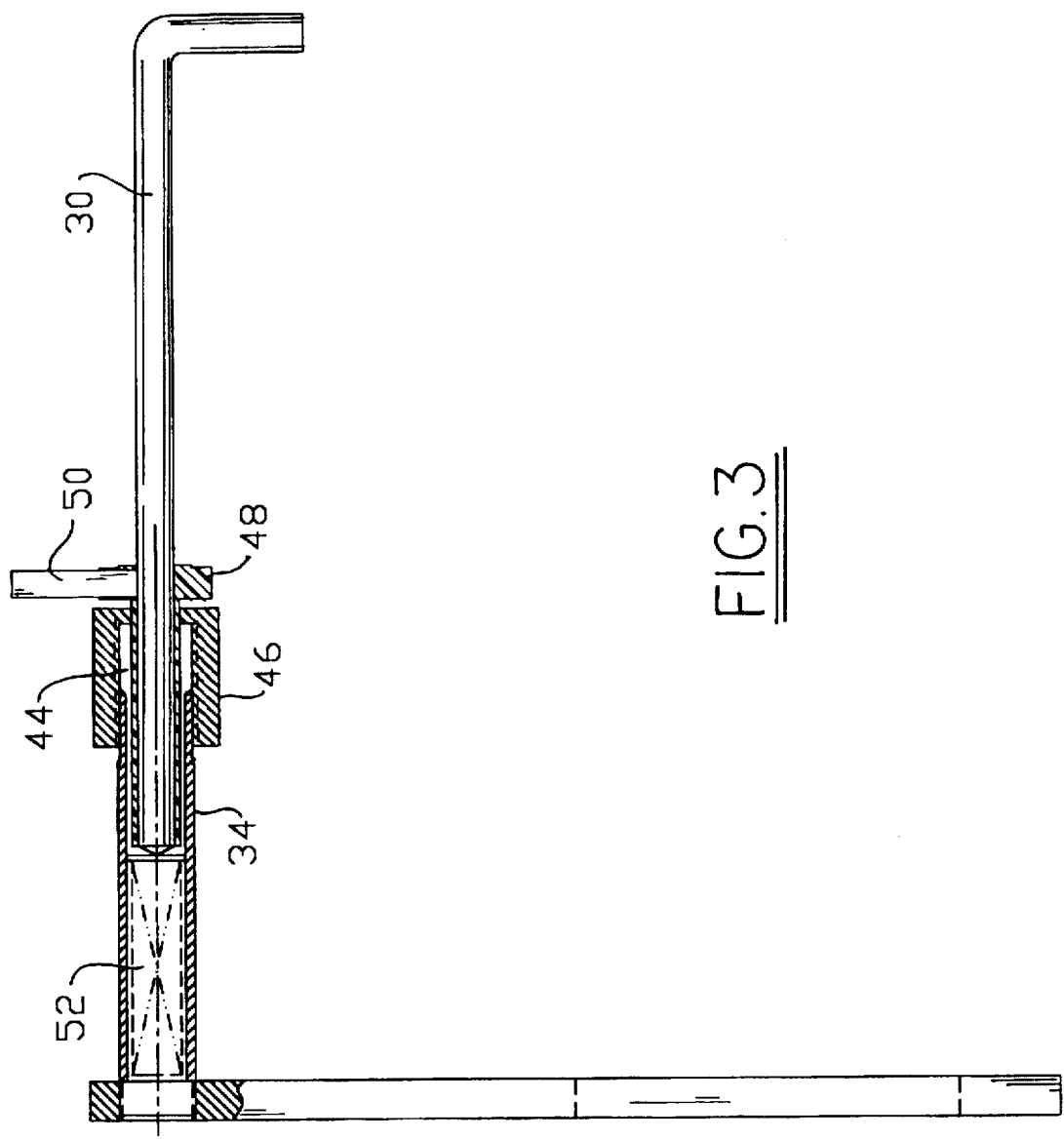
FIG. 3 is a schematic partial cross-sectional view of a preferred embodiment of the probe used by the invention.

In a preferred embodiment shown in FIG. 3, probe 30 comprises a rigid element, namely, a small Allen wrench (e.g., 0.125 inch/3 mm) held within elongated body 34 by means of a collet 44 tightened by a thumb cap 46. Probe 30 is insulated from body 34 by means of a nylon sleeve 48. A set screw 50 holds probe 30 in position against a small spring 52.

We claim:

1. A system for detecting inaccurate workpieces being manufactured by an automatic screw machine having a machine drive with cyclical operations that (a) serially feed and position the distal end of each of a plurality of workpiece bars in a respective one of a plurality of work-holding spindles and (b) serially index said spindles relative to a plurality of tool-holding work stations in a cyclical manner so that respective tools located at successive work stations progressively form the distal end portion of each said bar workpiece into a product having specified dimensions including a predetermined length, said product being partially formed at each successive work station as said workpiece bar is indexed from (i) a first work station, at which said distal end of each said workpiece bar is serially fed to a pre-shaping location within said respective work-holding spindle so that said distal end portion of said workpiece bar projects beyond the face of said spindle a distance equal to or greater than said predetermined product length, through (ii) a final work station, at which said product is separated from said workpiece bar, said detector comprising:

a programmable logic controller for receiving inputs related to and developing control signals for said machine drive;

a switch, responsive to said machine drive whenever said machine drive initiates one of said cyclical operations, for causing said controller to initiate a timing circuit of a predetermined duration;

a probe signal circuit, including a probe located intermediate two of said work stations and having a part-contacting portion positioned in the path of said distal end of said workpiece when said spindles are indexed between said two work stations, for delivering a probe signal to said controller whenever said probe is contacted by the distal end of a workpiece; and said controller being programmed to create:

a first control signal for directing said machine drive to continue said serial cyclical operation whenever said probe signal is received during said predetermined duration of said timing circuit; and a second control signal for stopping operation of said machine drive and for providing a sensible indication whenever said probe signal is not received during said predetermined duration of said timing circuit.

2. The detection system of claim 1 wherein the location of said probe is fixed relative to said work stations.

3. The detection system of claim 2 wherein the location of said probe is selected so that said probe does not interfere in any way with the operation of tools located at either of the said two work stations during said cyclical and serial operations of said machine.

4. The detection system of claim 1 wherein said sensible indication comprises initiation of a repetitive sensible signal.

5. The detection system of claim 4 wherein said sensible signal is a flashing warning light.

6. A system for detecting inaccurate workpieces being manufactured by an automatic screw machine having a machine drive with cyclical operations that (a) serially feed and position the distal end of each of a plurality of workpiece bars in a respective one of a plurality of work-holding spindles and (b) serially index said spindles relative to a plurality of tool-holding work stations in a cyclical manner so that respective tools located at successive work stations progressively form the distal end portion of each said bar workpiece into a product having specified dimensions including a predetermined length, said product being partially formed at each successive work station as said workpiece bar is indexed from (i) a first work station, at which said distal end of each said workpiece bar is serially fed to a pre-shaping location within said respective work-holding spindle so that said distal end portion of said workpiece bar projects beyond the face of said spindle a distance equal to or greater than said predetermined product length, through (ii) a final work station, at which said product is separated from said workpiece bar, said detector comprising:

- a programmable logic controller for receiving inputs related to and developing control signals for said machine drive;
- a switch located in proximity to a feed throw arm that is actuated by said machine drive at the initiation of each said cyclical operation, said switch being responsive to the actuation of said machine drive whenever said machine drive initiates one of said cyclical operations for causing said controller to initiate a timing circuit of a predetermined duration;
- a probe signal circuit, including a probe located intermediate two of said work stations and having a part-contacting portion positioned in the path of said distal end of said workpiece when said spindles are indexed between said two work stations, for delivering a probe signal to said controller whenever said probe is contacted by the distal end of a workpiece; and said controller being programmed to create:
- a first control signal for directing said machine drive to continue said serial cyclical operation whenever said probe signal is received during said predetermined duration of said timing circuit; and
- a second control signal for stopping operation of said machine drive and for providing a sensible indication whenever said probe signal is not received during said predetermined duration of said timing circuit.

7. A system for detecting inaccurate workpieces being manufactured by an automatic screw machine having a machine drive with cyclical operations that (a) serially feed and position the distal end of each of a plurality of workpiece bars in a respective one of a plurality of work-holding spindles and (b) serially index said spindles relative to a plurality of tool-holding work stations in a cyclical manner so that respective tools located at successive work stations progressively form the distal end portion of each said bar workpiece into a product having specified dimensions including a predetermined length, said product being partially formed at each successive work station as said workpiece bar is indexed from (i) a first work station, at which said distal end of each said workpiece bar is serially fed to a pre-shaping location within said respective work-holding spindle so that said distal end portion of said workpiece bar projects beyond the face of said spindle a distance equal to or greater than said predetermined product length, through (ii) a final work station, at which said product is separated from said workpiece bar, and wherein said machine and said workpiece bars are electrically grounded during machine operation, said detector comprising:

- a programmable logic controller for receiving inputs related to and developing control signals for said machine drive;
- a switch, responsive to said machine drive whenever said machine drive initiates one of said cyclical operations, for causing said controller to initiate a timing circuit of a predetermined duration;
- a probe signal circuit comprising a probe, located intermediate two of said work stations and having a part-contacting portion positioned in the path of said distal end of said workpiece when said spindles are indexed between said two work stations, and a transistor switch having an open element, said transistor switch being actuated whenever said open element is grounded, and said probe being connected to said open element for delivering a probe signal to said controller whenever said probe is grounded by contact with the distal end of a workpiece; and said controller being programmed to create:
- a first control signal for directing said machine drive to continue said serial cyclical operation whenever said probe signal is received during said predetermined duration of said timing circuit; and
- a second control signal for stopping operation of said machine drive and for providing a sensible indication whenever said probe signal is not received during said predetermined duration of said timing circuit.

8. The detection system of claim 7 wherein said probe comprises an electrically conductive member insulated from said grounded machine.

9. The detection system of claim 8 wherein said electrically conductive member is rigid.

* * * * *